(No Model.)
C. BAILEY.
COMBINED GARDEN HOE AND RAKE.
No. 538,146. Patented Apr. 23, 1895.
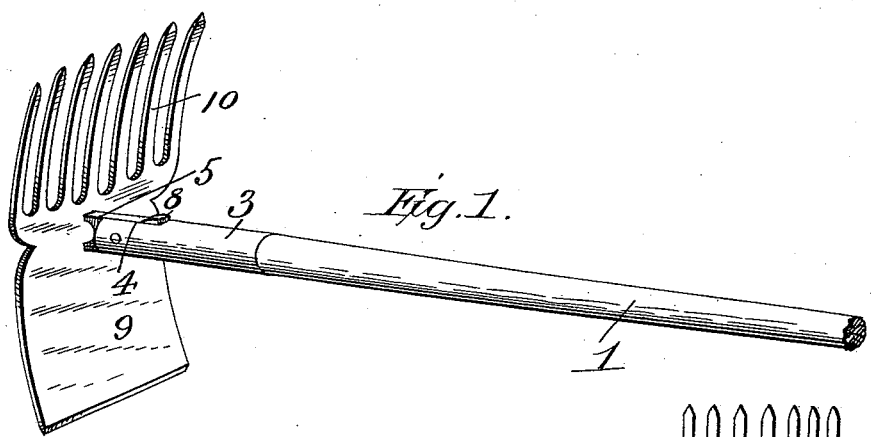
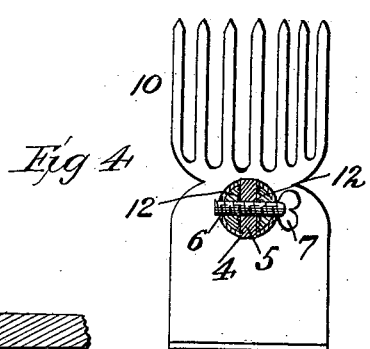
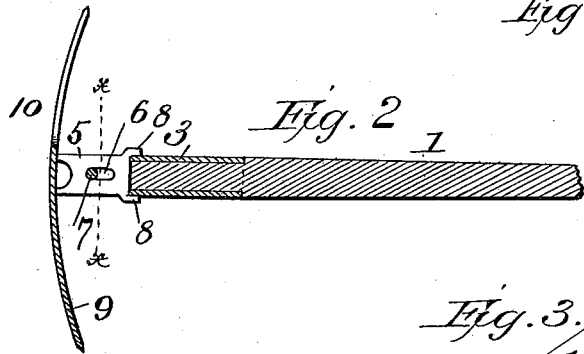
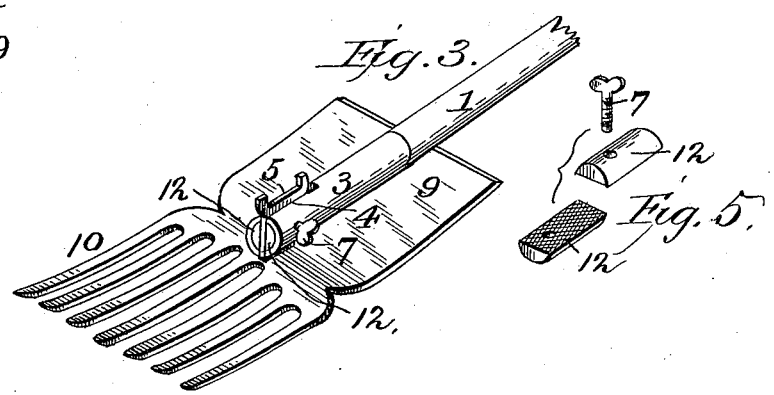
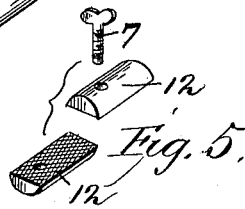
WITNESSES:
F. L. Ourand
W. L. Coombs
INVENTOR:
Clem Bailey,
by James Bagger & Co.
Attorneys.

UNITED STATES PATENT OFFICE.

CLEM BAILEY, OF KINSTON, NORTH CAROLINA.

COMBINED GARDEN HOE AND RAKE.

SPECIFICATION forming part of Letters Patent No. 538,146, dated April 23, 1895.

Application filed September 20, 1894. Serial No. 523,606. (No model.)

*To all whom it may concern:*

Be it known that I, CLEM BAILEY, a citizen of the United States, and a resident of Kinston, in the county of Lenoir and State of North Carolina, have invented certain new and useful Improvements in a Combined Garden Hoe and Rake; and I do hereby declare that the following is a full, clear, and exact description of the invention, which will enable others skilled in the art to which it appertains to make and use the same, reference being had to the accompanying drawings, which form a part of this specification.

My invention relates to improvements in combined garden hoes and rakes, which may be converted into a spading shovel, or a hay fork as may be desired.

The object of the invention is to provide an improved device of the above character by which the different adjustments may be readily and easily accomplished, and it consists in the novel construction and combination of parts hereinafter fully described and claimed.

In the accompanying drawings: Figure 1 is a perspective view of a combined garden hoe and rake, constructed in accordance with my invention. Fig. 2 is a central longitudinal section of the same. Fig. 3 is a similar view, showing the implement employed as a hay fork. Fig. 4 is a cross sectional view on the line $x$—$x$, Fig. 2. Fig. 5 is a detail view of the blocks and pin.

In the said drawings, the reference numeral 1 designates an ordinary wooden handle. The numeral 3 designates a socket consisting of a tapering metal cylinder having diametrical slots 4, extending from the outer end to near the middle, which register with each other. Located within these slots is a hinge-plate 5, having an oblong opening or hole 6, therein, through which passes a pivot pin 7. The object of making this hole elongated or oblong, is to allow of the plate having a slight horizontal play on its pivot, so that it may be moved in and out. At its inner end this plate is provided with two lugs 8, which, when the implement is used as a hoe or rake, as seen in Figs. 1 and 2 engage with the inner ends of the slots in the socket. The outer end of plate 5 is firmly secured to a hoe 9, having the side edges bent or curved upwardly, as seen in Fig. 3.

The numeral 10 designates a number of rake-teeth formed with or secured to the hoe.

Located within the socket 3, are two semicircular blocks 12 the flat faces of which bear against plate 5 and are corrugated as seen in Fig. 4. These blocks are formed with screw-threaded apertures through which the screw-threaded pivot pin 7 passes.

The operation will be readily understood. When in the position shown in Fig. 1, the lugs 8 of the plate 5 engage with the ends of the slots in the socket, while the blocks 12 bear tightly against the plate, thereby holding the parts in position. To convert the hoe or rake into a hay fork or spade, the pivot pin 7 is loosened and the plate 5 is pulled outwardly so as to disengage the lugs from the slots, and then the hoe is turned on the pivot, so as to occupy a horizontal, or nearly horizontal position.

In Fig. 3 the implement is adjusted to serve as a hay fork, but it is obvious that by reversing it, it can be converted into a spade.

The side edges of the hoe blade are bent or curved forming flanges 12, which serve to hold the dirt on the same when used as a spade or shovel, and prevent it from falling off at the side.

Having thus described my invention, what I claim is—

The combination with the handle, the slotted socket secured thereto, and the semicircular blocks, of the plate having an elongated opening, and having its inner end formed with lugs, the screwthreaded pivot pin passing through said slot and the socket and blocks and the hoe having teeth secured to said plate, substantially as described.

In testimony that I claim the foregoing as my own I have hereunto affixed my signature in presence of two witnesses.

CLEM BAILEY.

Witnesses:
JNO. L. HARTSFIELD,
E. S. PITTMAN.